(12) United States Patent
Harada et al.

(10) Patent No.: US 11,802,225 B2
(45) Date of Patent: Oct. 31, 2023

(54) METHOD FOR PRODUCING POLYLACTIC ACID-BASED HOT MELT ADHESIVE

(71) Applicant: BP CONSULTING, INC., Tokyo (JP)

(72) Inventors: Koutarou Harada, Tokyo (JP); Takeyuki Yamamatsu, Tokyo (JP); Toshiaki Yamamatsu, Tokyo (JP)

(73) Assignee: BP CONSULTING, INC., Tokyo (JP)

( * ) Notice: Subject to any disclaimer, the term of this patent is extended or adjusted under 35 U.S.C. 154(b) by 620 days.

(21) Appl. No.: 17/042,126

(22) PCT Filed: Apr. 5, 2019

(86) PCT No.: PCT/JP2019/015128
§ 371 (c)(1),
(2) Date: Sep. 27, 2020

(87) PCT Pub. No.: WO2019/220806
PCT Pub. Date: Nov. 21, 2019

(65) Prior Publication Data
US 2021/0009873 A1 Jan. 14, 2021

(30) Foreign Application Priority Data

May 18, 2018 (JP) ................................ 2018-096583

(51) Int. Cl.
*C09J 167/04* (2006.01)
*C09J 7/35* (2018.01)
(Continued)

(52) U.S. Cl.
CPC ........... *C09J 167/04* (2013.01); *C08K 5/0016* (2013.01); *C08K 5/06* (2013.01); *C08K 5/092* (2013.01);
(Continued)

(58) Field of Classification Search
CPC ... C09J 167/04; C09J 7/35; C09J 11/06; C09J 2467/00; C08K 5/0016; C08K 5/06;
(Continued)

(56) References Cited

U.S. PATENT DOCUMENTS 5,252,646 A 10/1993 Iovine et al.

FOREIGN PATENT DOCUMENTS

| EP | 2781532 A1 * | 9/2014 | ........... C08G 63/912 |
| JP | 1993-339557 A | 12/1993 | |

(Continued)

*Primary Examiner* — Daniel Mcnally
(74) *Attorney, Agent, or Firm* — LIANG LEGAL GROUP, PLLC

(57) ABSTRACT

A method for manufacturing a polylactic acid-based hot melt adhesive includes: (1) preparing a first polylactic acid composition by adding a phosphite and a hindered phenol to a mixture prepared by adding and melt-mixing a first polylactic acid (relative viscosity 2.5-4.0) in a liquid mixture of a dithiocarbamate and a plasticizer at 180 to 280° C., wherein with respect to 100 parts by weight of the first polylactic acid, 10 to 100 parts by weight of the plasticizer, 0.02 to 0.3 parts by weight of the dithiocarbamate, 1 to 10 parts by weight of the phosphite, and 1 to 10 parts by weight of the hindered phenol are used; and (2) mixing a second polylactic acid (relative viscosity 2.5-4.0), into the first polylactic acid composition at 180-280° C., a weight ratio of the first polylactic acid/the second polylactic acid is 2/8 to 8/2.

11 Claims, 1 Drawing Sheet a b

(51) Int. Cl.
  *C08K 5/00* (2006.01)
  *C08K 5/06* (2006.01)
  *C08K 5/092* (2006.01)
  *C08K 5/134* (2006.01)
  *C08K 5/39* (2006.01)
  *C08K 5/524* (2006.01)
  *C09J 11/06* (2006.01)

(52) U.S. Cl.
  CPC .............. *C08K 5/134* (2013.01); *C08K 5/39* (2013.01); *C08K 5/524* (2013.01); *C09J 7/35* (2018.01); *C09J 11/06* (2013.01); *C09J 2467/00* (2013.01)

(58) Field of Classification Search
  CPC .......... C08K 5/092; C08K 5/134; C08K 5/39; C08K 5/524; C09K 15/32; C09K 15/08; C09K 15/26
  See application file for complete search history.

(56) References Cited

FOREIGN PATENT DOCUMENTS

| | | |
|---|---|---|
| JP | 1997-505615 A | 6/1997 |
| WO | 1995-010577 A | 4/1995 |

* cited by examiner

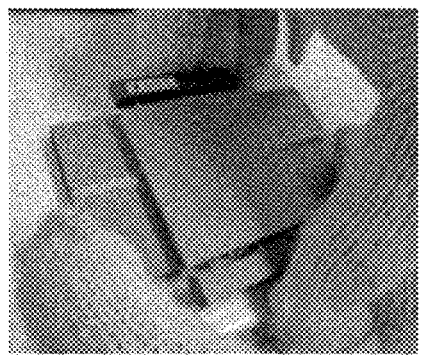  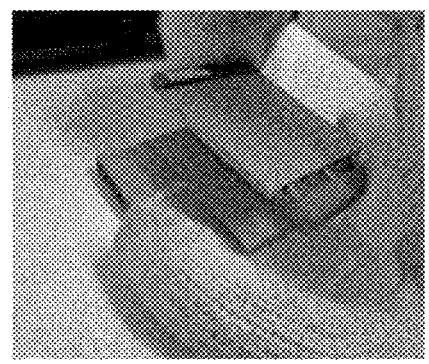
a	b

METHOD FOR PRODUCING POLYLACTIC ACID-BASED HOT MELT ADHESIVE

TECHNICAL FIELD

The present invention relates to a method for manufacturing a polylactic acid-based hot melt adhesive, particularly, relates to a manufacturing method that includes a process that heats a polylactic acid in the presence of a dithiocarbamate, a phosphite ester, and a hindered phenol.

BACKGROUND ART

After being melted by heat and applied onto an object, a hot melt adhesive is cooled down and hardened, and thus adheres to the object. The hot melt adhesive is widely used in applications, such as packing, bookbinding, and woodworking. The hot melt adhesive generally includes a base polymer, a tackifying resin, a plasticizer, and an additive, such as a stabilizer. As the base polymer, for example, a thermoplastic resin, such as an ethylene-vinyl acetate copolymer, is used. As the tackifying resin, for example, a rosin ester or a petroleum resin is used. As the plasticizer, a paraffin wax is used. As the heat stabilizer, for example, BHT is used.

Nowadays, since, for example, a packing material, a bound book, and a woodworking product can be biodegraded even with the hot melt adhesive being attached thereto, those containing a lactic acid-based polymer or copolymer (hereinafter referred to as "polylactic acid-based") as the base polymer and/or the tackifying resin have been variously proposed. For example, there have been known a hot melt composition (Patent Document 1) containing a lactic acid homopolymer or a lactic acid copolymer, and a tackifying resin, such as a rosin, a hot melt tacky/adhesive agent (Patent Document 2) containing a lactic acid-based adhesive resin, and a hot melt adhesive (Patent Document 3) in which any one or both of a thermoplastic resin and a tackifying resin contain a lactic acid copolymer resin derived from a polylactic acid or a lactic acid and another hydroxy carboxylic acid.

However, a lactic acid-based resin is easily pyrolyzed. For example, the hot melt adhesive in Patent Document 1 is disclosed that an initial viscosity at 177° C. was 4,125 cps, and after storing for 72 hours, it became 175 cps (Patent Document 1, Table 2). Patent Document 2 discloses a viscosity change of the hot melt adhesive at 150° C., and, for example, the viscosity that used to be 15,000 cps after one hour from the preparation became 8,500 cps after four hours.

The hot melt adhesive in Patent Document 3 is said to have a viscosity change after being left for 24 hours at 190° C. of within 10%, and thus, be heat-stable. However, it is not easy to dehydrate and polycondense a lactic acid, contain a resin having a weight average molecular weight of more than 10000 and a tackifying resin having a weight average molecular weight of less than 10000, and prepare both, and just preparing the latter took three hours (Patent Document 3, for example, Example 1). The present situation is that the hot melt adhesive using the polylactic acid as the base polymer has not been practically used due to the above-mentioned reasons.

PRIOR ART REFERENCES

Patent Document 1: U.S. Pat. No. 5,252,646
Patent Document 2: JP-H9-505615A
Patent Document 3: JP-H5-339557A

SUMMARY OF THE INVENTION

Problems To Be Solved By The Invention

An objective of the present invention is to provide manufacturing methods that can ensure easy preparation of polylactic acid-based hot melt adhesives having heat stability to withstand practical uses.

Solutions To The Problems

As the result of various examinations, the inventors have succeeded to add a viscosity to a polylactic acid in a controlled manner, thus completing the present invention. That is, the present invention is as follows.

A method for manufacturing a polylactic acid-based hot melt adhesive including:

(1) a step of preparing a first polylactic acid composition by adding a phosphite and a hindered phenol into a mixture formed by adding and melt-mixing 100 parts by weight of a first polylactic acid having a relative viscosity of 2.5 to 4.0, measured in accordance with ASTM D5225, into a liquid mixture of a dithiocarbamate and a plasticizer at a temperature of 180 to 280° C.; with respect to the 100 parts by weight of the first polylactic acid, 10 to 100 parts by weight of the plasticizer, 0.02 to 0.3 parts by weight of the dithiocarbamate, 1 to 10 parts by weight of the phosphite, and 1 to 10 parts by weight of the hindered phenol are added; the first polylactic acid composition having a viscosity of 70 to 700 mPa·s measured at 180 to 220° C.; and (2) a step of mixing a second polylactic acid having a relative viscosity of 2.5 to 4.0, measured in accordance with ASTM D5225, into the first polylactic acid composition at a temperature of 180 to 280° C., wherein a weight ratio of the first polylactic acid/the second polylactic acid is from 2/8 to 8/2.

Effects of the Invention

By using a combination of the dithiocarbamate, the phosphite, and the hindered phenol, a method of the present invention ensures obtaining the polylactic acid-based hot melt adhesive easier and in a shorter time than using a conventional reaction that polymerizes a lactic acid monomer to obtain a tackifying resin. The obtained adhesive ensures achieving adhesive strength equal to or greater than that of an ethylene vinyl acetate (EVA)-based hot melt adhesive, which is now widely used.

BRIEF DESCRIPTION OF THE DRAWINGS

FIG. 1 shows photographs illustrating an Example for examining adhesive strength in a heat-resistant adhesion test, a cold-resistant adhesion test, and an accelerated aging test.

DETAILED DESCRIPTION OF THE INVENTION

In the present invention an "adhesive" means both a tacky agent and an adhesive. While the "tacky agent" is different from the adhesive in that it temporarily attaches by an addition of a pressure and that it can be separated on an interface with an object, it can be obtained in a method similar to that of obtaining the adhesive, although there is a difference, such as it contains more plasticizer than the adhesive.

In the present invention, Step (1) is a step of adding a phosphite and a hindered phenol after melting a first polylactic acid in the presence of a dithiocarbamate and a plasticizer to prepare a first polylactic acid composition within a predetermined viscosity range. A molten polylactic acid is known to have its molecular weight decreased mainly by pyrolysis. The mechanism is various, and an occurrence of recombination of decomposition products is known in addition to a decomposition mechanism, such as a random decomposition reaction and an intramolecular transesterification reaction, thereby being very complicated. The phosphite and the hindered phenol are known as a stabilizing agent that suppresses such a decomposition of the polylactic acid. The dithiocarbamate is a crosslinking agent of rubber and is used as a stabilizing agent of a rubber-based hot melt adhesive. Surprisingly, however, while the dithiocarbamate functions as a decomposing agent for the polylactic acid, it was found that the dithiocarbamate did not inhibit a stabilizing effect of the phosphite or the hindered phenol for the polylactic acid. Adding the combination of these into the polylactic acid caused a success in decreasing the molecular weight of the polylactic acid, which is the objective. While the phosphite and the hindered phenol may be added from the start, it is preferred to be added after the decomposition reaction of the first polylactic acid has progressed to some extent.

The dithiocarbamate is expressed by the following general formula.

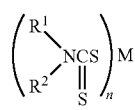

[Chem. 1]

In the formula above, $R^1$ and $R^2$ are independently an alkyl group of C1 to C6 or an aromatic group of C6 to C12, M is a metal atom in group 1, group 12, or group 16, and n is an integer of 1 to 3. As the alkyl group, for example, a methyl group, an ethyl group, and a butyl group are exemplarily illustrated, and may be branched. As examples of the aromatic group, for example, a phenyl group, a methyl phenyl group, and an ethyl phenyl group are included. More preferably, $R^1$ and $R^2$ are independently selected from the methyl, ethyl, butyl, and ethyl phenyl groups, and M is selected from sodium, copper, steel, zinc, selenium, and tellurium. Most preferably, $R^1$ and $R^2$ are n-butyl, M is the zinc, and n is 2.

The dithiocarbamate can control a degradation or a molecular weight of the first polylactic acid by its additive amount. 0.02 to 0.3 parts by weight is used with respect to 100 parts by weight of the first polylactic acid, and, preferably, 0.04 to 0.2 parts by weight is used. When the amount of dithiocarbamate is less than the lower limit value, an acceleration effect in decreasing molecular weight of the first polylactic acid is not sufficient, and when the amount exceeding the upper limit value is used, the control of the molecular weight becomes difficult.

The first polylactic acid may be any one of an amorphous polymer, a semicrystalline in a melting point of 130 to 180° C., or a high crystalline polymer, depending on a content and an arrangement of a D-lactic acid and an L-lactic acid. In terms of adhesive property, the amorphous polymer is preferred and in terms of less blocking of hot melt adhesive, the crystalline polymer is preferred, and they can be appropriately mixed and used.

As the method for manufacturing the polylactic acid, it may be those manufactured by any one of an obtaining method that dehydrates and polycondenses a lactic acid monomer or a method that prepares a cyclic lactide of lactic acid dimer and performs a ring-opening polymerization. Preferably, the polylactic acid manufactured by the latter method is used.

The first polylactic acid may be a copolymer of a lactic acid and another monomer or may be a mixture of a polylactic acid and this copolymer. Examples of the other monomer include, for example, a hydroxy carboxylic acid, such as a glycolic acid and a hydroxybutyric acid, and lactones, such as an ε-caprolactone.

The first polylactic acid has a relative viscosity of 2.5 to 4.1 measured in accordance with ASTM D5225. ASTM D5225 is a method for measuring a viscosity of a solution of a polymer dissolved in a solvent with a differential viscometer. In the present invention, chloroform is used as the solvent, and the viscosity is of the solution having a concentration of the polylactic acid of 1.0 g/100 mL at 30° C. Preferably, the polylactic acid having a relative viscosity of 3.2 to 4.1 is used.

The plasticizer may be any one as long as it is used for the polylactic acid, for example, polyhydric alcohols, such as a propylene glycol and a polyglycerin, a polyhydric alcohol ester, such as a glycerin ester, a glycerin ester monoglyceride, and a polyglycerol ester of fatty acid, a polycarboxylic acid ester, such as a dialkyl adipate, a phthalate ester, and an epoxidized vegetable oil can be used. Among these, a glycerin triacetate, a butyl benzyl phthalate, an epoxidized soybean oil, a tall oil, an adipate, the polyglycerol ester of fatty acid, and their mixture are preferred.

The plasticizer is 10 to 100 parts by weight with respect to 100 parts by weight of the first polylactic acid, and, preferably, 20 to 80 parts by weight is used. Preferably, when the final product is a hot melt tacky agent for usages of a label, a craft tape, an OPP tape, and a cloth tape, the amount of the plasticizer is 20 to 50 weight % of the total weight of the first polylactic acid, a second polylactic acid, and the plasticizer, more preferably, 20 to 40 weight %. Meanwhile, in the case of a hot melt adhesive, it preferably is 5 to 20 weight % of the same total weight, more preferably, 8 to 15 weight %.

The heating temperature is 180 to 280° C., preferably 200 to 250° C., and more preferably 210 to 220° C. When the temperature is less than the lower limit value, the decrease of the molecular weight is slow, when the temperature exceeds the upper limit value, this decreasing speed is fast, thereby causing the difficulty in control. When the first polylactic acid is added, it is preferred to add by dividing into multiple times, for example, 2 to 4 times, such that the temperature does not fall outside the above-described range.

After the first polylactic acid is melt-mixed, the phosphite and the hindered phenol are added. The timing for the addition differs depending on a reaction vessel, a heating temperature, and the like, but it typically is approximately 40 minutes to 80 minutes after the heating has started.

Examples of the phosphite include a monophosphite, a hypophosphite ester, and pentaerythritol phosphite ester expressed by the following formulae. The monophosphite is expressed by the following formula.

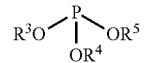

[Chem. 2]

In the formula above, $R^3$ to $R^5$ are independently an alkyl group of C6 to C16 or an aromatic group of C6 to C18, or adjacent two groups from $R^3$ to $R^5$ groups may form a cyclic structure linked by an alkylene group of C1 to C3. Preferably, $R^3$ to $R^5$ are independently an alkyl group having C8 to C10, a phenyl group, a di-t-butylphenyl group, or a nonylphenyl group, more preferably, two out of $R^3$ to $R^5$ are the di-t-butylphenyl group, and they are linked by a methylene group to form a cyclic structure.

The hypophosphite ester is expressed by the following formula.

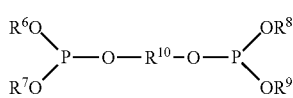

[Chem. 3]

$R^6$ to $R^9$ are independently an alkyl group of C10 to C18, $R^{10}$ is an alkylene oxyalkylene group of C2 to C4, or a 4,4'-isopropylidene-diphenylene group.

The pentaerythritol phosphite ester is expressed by the following formula.

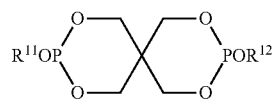

[Chem. 4]

$R^{11}$ and $R^{12}$ are independently an alkyl group of C16 to C20 or an aromatic group of C6 to C20.

Preferably, the monophosphite is used, and more preferably, a 2,2-methylenebis(4,6-di-t-butylphenyl)2-ethylhexyl phosphite or 2-ethylhexyl diphenyl phosphite is used.

With respect to 100 parts by weight of the first polylactic acid, the phosphite is used at 1 to 10 parts by weight, more preferably 2 to 6 parts by weight.

The hindered phenol is a phenol having at least one group adjacent to a phenolic hydroxyl group is a three-dimensionally bulky substituent, such as a tert-butyl group, and the examples include a 1,1,3-tris(2-methyl-4-hydroxy-5-tert-butylphenyl)butane, a 4,4'-butylidenebis(6-tert-butyl-3-methylphenol), 3-(1,1-dimethyl ethyl)-4-hydroxy-5-methyl benzene propionic acid 2,4,8,10-tetraoxaspiro[5.5]undecane-3,9-diyl bis(2,2-dimethyl-2,1-ethanediyl)ester, a 2,6-di-tert-butylphenol, a 1,3,5-tris(di-tert-butyl-4-hydroxyphenylmethyl)-2,4,6-trimethylbenzene), a 1,3,5-trimethyl-2,4,6-tris(3,5-di-tert-butyl-4-hydroxybenzyl)benzene, pentaerythritol tetrakis(3-(3,5-di-tert-butyl-4-hydroxyphenyl)propionate), sorbitolhexa-(3-(3,5-di-tert-butyl-4-hydroxyphenyl)propionate), n-octadecyl-3(3,5-di-tert-butyl-4-hydroxyphenyl)propionate, 2,4,6-tris(4-hydroxy-3,5-di-tert-butyl-phenoxy)-1,3,5-triazine, and a 1,3,5-tris(3,5-di-tert-butyl-4-hydroxybenzyl)-1,3,5-triazinane-2,4,6(1H,3H,5H)-trione. Preferably, one that has the tert-butyl group at an ortho position and a methyl group at a meta position of the phenolic hydroxyl group, for example, the 1,1,3-tris(2-methyl-4-hydroxy-5-tert-butylphenyl)butane and the 4,4'-butylidenebis(6-tert-butyl-3-methylphenol) are used, and more preferably the 1,1,3-tris(2-methyl-4-hydroxy-5-tert-butylphenyl)butane is used.

With respect to 100 parts by weight of the first polylactic acid, the hindered phenol is used at 1 to 10 parts by weight, more preferably 2 to 6 parts by weight.

At Step (1), a tackifying resin, such as a rosin ester and a terpene phenol resin, and waxes, such as a carnauba wax, a polyester wax, and an ester amide wax, may be added. The additive amount is approximately 40 weight % or less with respect to 100 weight % of the sum of the first polylactic acid, the plasticizer, and the second polylactic acid.

After the phosphite and the hindered phenol are added in 180 to 280° C., until the viscosity of the reaction mixture becomes 70 to 700 mPa·s, preferably 90 to 550 mPa·s, using a viscosimeter, such as a Brookfield rotational viscometer, that is set to 180 to 220° C., the reaction mixture is stirred maintaining this temperature, thus obtaining the first polylactic acid composition. The period needed for Step (1) may change depending on a reaction vessel, a preparation amount, and the like, but is approximately 40 minutes to approximately 80 minutes. This is significantly short compared with the method that polymerizes the tackifying resin.

Step (2) is a step of obtaining the hot melt adhesive by mixing the second polylactic acid in the first polylactic acid composition obtained at Step (1). Step (2) may be run as a continuous process of Step (1) or may be run after the first polylactic acid composition is stored for a certain period of time after Step (1). Preferably, Steps (1) and (2) are continuously run.

The second polylactic acid may be as same as or different from the first polylactic acid. Preferably, a polylactic acid of a kind similar to the first polylactic acid is used.

The amount is where the mixture ratio of the first and second polylactic acids, that is, the weight ratio (the first polylactic acid/the second polylactic acid) becomes 2/8 to 8/2, preferably 3/7 to 7/3.

The temperature at the second step is set to 180 to 280° C., preferably 200 to 250° C., more preferably 210 to 220° C. The period needed for Step (2) may also change depending on a reaction vessel, a preparation amount, and the like, but is 40 to 90 minutes.

The viscosity of the obtained hot melt adhesive composition is 1,000 to 10,000 mPa·s, preferably 1,000 to 5,000 mPa·s, using the Brookfield rotational viscometer set at 180° C. This viscosity is a viscosity measured after being left at room temperature for 24 hours and further redissolved after the termination of the manufacturing process.

The hot melt adhesive is transferred into a mold made of a silicone resin or onto a cooling steel belt in a molten state, cooled to be hardened into a form of pellet, strip-shaped, drop, block, stick, flake, powder, film, or the like. In order to prevent a moisture absorption, it is preferred to be provided in a moisture-proof aluminum lamination bag or a sealing container.

The hot melt adhesive is remelted in 150 to 200° C., and is applied and adheres for, for example, cardboard box making, compact paper container box making, packing in bag making, backlining in bookbinding, woodwork frame sticking, woodwork plywood core, and component assembly, using an applicator, and is also used for an aluminum cap sealing material, a cut tape, a thermal label, and the like, using a coater.

EXAMPLE

The hot melt adhesive was prepared by the following method.

(1) 16 g of an epoxidized soybean oil, 28 g of an adipate, and 0.28 g of a zinc di-n-butyldithiocarbamate (the ACCEL BZ, made by KAWAGUCHI CHEMICAL INDUSTRY CO., LTD.) were added in a 500 ml separable flask including a stirring device, after being heated at 270° C. using a heating mantle and stirred for 15 minutes, 200 g of a first polylactic acid (Ingeo 4060D, made by NatureWorks LLC) was added in the separable flask, and continued to stir and mix for 40 minutes. After turning the set temperature of the heating mantle to 240° C. and stirring and mixing for 15 minutes, 4 g each of a phosphite (ADK STAB HP10, a 2,2-methylenebis(4,6-di-t-butylphenyl)2-ethylhexyl phosphite, made by ADEKA Corporation) and a hindered phenol (ADK STAB AO-30, a 1,1,3-tris(2-methyl-4-hydroxy-5-tert-butylphenyl)butane, made by ADEKA Corporation) were added, and stirred and mixed for 5 minutes, thus, a first polylactic acid composition was obtained. The viscosity of this composition was 400 to 500 mPa·s using a Brookfield rotational viscometer set at 180° C.

(2) Next, the temperature of the heating mantle was turned to 270° C., 156 g of a second polylactic acid (Ingeo 4060D) was added, and, after being stirred and mixed for 40 minutes, was continued to be stirred and mixed for 50 minutes while gradually decreasing the temperature to 190° C.

The obtained molten hot melt adhesive was flown into a silicone mold sheet of 2 cm×1 cm×0.2 cm×300 pieces, and naturally cooled down to obtain a strip-shaped hot melt adhesive composition.

Heat Stability Test

The initial melt viscosity at 180° C. and the melt viscosity after 24 hours of the hot melt adhesive obtained in Example were measured with the Brookfield viscometer and the heat stability was examined. The results were the initial viscosity of 1,085 mPa·s, after 4 hours of 1,037 mPa·s (viscosity changing rate 4.4%), after 8 hours of 1,017 mPa·s (viscosity changing rate 6.3%), after 12 hours of 1,007 mPa·s (viscosity changing rate 7.2%), and after 24 hours of 992 mPa·s (viscosity changing rate 8.6%). This initial viscosity is, as described above, the viscosity measured after being left at room temperature for 24 hours and redissolved after the termination of manufacturing process.

Adhesive Test

At room temperature, an open time (Test 1) and a set time (Test 2) were measured. The test condition is as follows.

Specimen: Surface liner K170/Core S115/Back liner K170 AF

Specimen Fabrication Condition: The hot melt agent melted at 180° C. was applied on the specimen (100×50 mm) with an application amount of approximately 3 g/m, and another specimen (50×50 mm) was press-adhered with a press load of 2 kg thereon. After the set time was fixed to two seconds or the open time was fixed to two seconds and the adhesion was made, the adhesive strength was measured using a hot melt testing machine (ASM-15 adhesive evaluation machine, made by TOKYO KOKI TESTING MACHINE CO.LTD.), and the condition of damage was visually observed. As a comparison specimen, an EVA-based hot melt agent (Nittaito HC-225SS, made by Nitta Gelatin Inc.) was used, and measurements at open time of 5, 10, and 15 seconds were performed in Test 1 and measurements at set time of 0.5, 1, and 5 seconds were performed in Test 2. The results are respectively shown in Tables 1 and 2. In the tables, "material failure" indicates a breakage of the specimen. "Interfacial peeling" means a delamination at an interface between the specimen and the adhesive layer, and "cohesive failure" means a breakage of the adhesive layer.

TABLE 1

Test 1: Open Time Measurement (Set Time Fixed To 2 Seconds)

| 5 Seconds | | 7 Seconds | | 10 Seconds | | 13 Seconds | | 15 Seconds | |
|---|---|---|---|---|---|---|---|---|---|
| Peeling Strength (kgf) | Evaluation | Peeling Strength (kgf) | Evaluation | Peeling Strength (kgf) | Evaluation | Peeling Strength (kgf) | Evaluation | Peeling Strength (kgf) | Evaluation |
| Example | | | | | | | | | |
| 7.43 | Material Failure | 7.43 | Material Failure | 7.38 | Material Failure | 6.8 | Material Failure | 6.39 | Material Failure |
| 8.28 | Material Failure | 8.28 | Material Failure | 7.51 | Material Failure | 6.98 | Material Failure | 7.24 | Material Failure |
| 7.87 | Material Failure | 7.87 | Material Failure | 7.03 | Material Failure | 7.12 | Material Failure | 8.23 | Material Failure |
| Comparative Example (EVA-Based Hot Melt Agent) | | | | | | | | | |
| 8.64 | Material Failure | | | 7.44 | Material Failure | | | | Interfacial Peeling |

TABLE 2

Test 2: Set Time Measurement (Open Time Fixed To 2 Seconds)

| 0.5 Seconds | | 1 Seconds | | 2 Seconds | | 3 Seconds | | 5 Seconds | |
|---|---|---|---|---|---|---|---|---|---|
| Peeling Strength (kgf) | Evaluation | Peeling Strength (kgf) | Evaluation | Peeling Strength (kgf) | Evaluation | Peeling Strength (kgf) | Evaluation | Peeling Strength (kgf) | Evaluation |
| Example | | | | | | | | | |
| | Cohesive Failure | 7.35 | Material Failure | 7.70 | Material Failure | 7.22 | Material Failure | 7.87 | Material Failure |
| | | 7.79 | Material Failure | | | | | | |

TABLE 2-continued

| Test 2: Set Time Measurement (Open Time Fixed To 2 Seconds) ||||||||||
|---|---|---|---|---|---|---|---|---|---|
| 0.5 Seconds || 1 Seconds || 2 Seconds || 3 Seconds || 5 Seconds ||
| Peeling Strength (kgf) | Evaluation | Peeling Strength (kgf) | Evaluation | Peeling Strength (kgf) | Evaluation | Peeling Strength (kgf) | Evaluation | Peeling Strength (kgf) | Evaluation |
| | | 7.42 | Material Failure | 7.49 | Material Failure | 7.43 | Material Failure | 7.80 | Material Failure |
| | | 8.11 | Material Failure | | | | | | |
| | | 7.25 | Material Failure | 7.41 | Material Failure | 7.98 | Material Failure | 8.25 | Material Failure |
| Comparative Example (EVA-Based Hot Melt Agent) ||||||||||
| | Cohesive Failure | 8.53 | Material Failure | | | | | 9.67 | Material Failure |

As illustrated in Table 1, the hot melt agent of Example was found to exhibit high adhesive strength even though the open time is long, compared with Comparative Example, which had the adhesive less strength. For the set time, it was found that Example and Comparative Example were approximately the same from Table 2. Note that at the set time of 0.5 seconds, it is considered that both the adhesives of Example and Comparative Example had insufficient hardening.

A heat-resistant adhesion test, a cold-resistant adhesion test, and an accelerated aging test were performed by the following methods.

Specimen: Surface liner K170/Core S115/Back liner K170 AF

Specimen Fabrication Condition: The hot melt agent obtained in Example was melted at 180° C. and applied on one surface of the specimen (100×50 mm) with an application amount of approximately 3 g/m, and another specimen (50×50 mm) was press-adhered with a press load of 2 kg thereon. After the specimen, obtained by being adhered with 2 seconds of open time and 2 seconds of set time, was left in each of the following environments, tools were respectively inserted from both ends of the adhering surface as illustrated in a in FIG. 1, and while these tools were gripped by hands and vertically pulled upward as illustrated in FIG. 1b, the condition of damage of the specimen was visually observed.

Heat-Resistant Adhesion

After five samples of the specimens were left at 60° C. for 5 days, the adhesive strength was measured. The results were material breakages of the specimens in all the five samples.

Cold Resistant Adhesion

After five samples of the specimens were left at −18° C. for 3 days, the adhesive strength was measured. The results were material breakages of the specimens in all the five samples.

Accelerated Aging Test

After fifteen samples of the specimens were left at 40° C. 90% RH for 96 hours, the samples were left at 23° C. 50% RH for 72 hours, and the adhesive strength was measured. The results were material breakages of the specimens in all the fifteen samples.

INDUSTRIAL APPLICABILITY

The manufacturing method of the present invention is significantly useful to easily preparing the polylactic acid-based hot melt adhesive composition that has heat stability to withstand a practical use.

What is claimed is:

1. A method for manufacturing a polylactic acid-based hot melt adhesive comprising:
   (1) preparing a first polylactic acid composition by adding a phosphite and a hindered phenol to a mixture that has been prepared by adding and melt-mixing 100 parts by weight of a first polylactic acid having a relative viscosity of 2.5 to 4.0, measured in accordance with ASTM D5225, in a liquid mixture of a dithiocarbamate and a plasticizer at a temperature of 180 to 280° C., wherein with respect to 100 parts by weight of the first polylactic acid, 10 to 100 parts by weight of the plasticizer, 0.02 to 0.3 parts by weight of the dithiocarbamate, 1 to 10 parts by weight of the phosphite, and 1 to 10 parts by weight of the hindered phenol are used, wherein the first polylactic acid composition having a viscosity of 70-700 mPa·s measured at 180 to 220° C.; and
   (2) mixing a second polylactic acid having a relative viscosity of 2.5-4.0, measured in accordance with ASTM D5225, into the first polylactic acid composition at a temperature of 180-280° C., wherein a weight ratio of the first polylactic acid/the second polylactic acid is from 2/8 to 8/2.

2. The method according to claim 1, wherein the dithiocarbamate has the following formula:

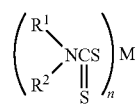

wherein
R$^1$ and R$^2$ are independently a C1-C6 alkyl group or a C6-C12 aromatic group,
M is a metal atom in group 1, group 12, or group 16, and
n is an integer of 1 to 3.

3. The method according to claim 2, wherein the plasticizer is at least one selected from the group consisting of a glycerin triacetate, a butyl benzyl phthalate, an epoxidized soybean oil, a tall oil, an adipate, and a polyglycerol ester of fatty acid.

4. The method according to claim 2, wherein the phosphite is a monophosphite having the following formula:

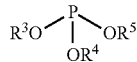

wherein
$R^3$-$R^5$ are independently a C6-C16 alkyl group or a C6-C18 aromatic group, or any two adjacent $R^3$-$R^5$ groups form a cyclic structure linked by a C1-C3 alkylene group.

5. The method according to claim 2, wherein the hindered phenol is a 1,1,3-tris(2-methyl-4-hydroxy-5-tert-butylphenyl)butane or a 4,4'-butylidenebis(6-tert-butyl-3-methylphenol).

6. The method according to claim 1, wherein the plasticizer is at least one selected from the group consisting of a glycerin triacetate, a butyl benzyl phthalate, an epoxidized soybean oil, a tall oil, an adipate, and a polyglycerol ester of fatty acid.

7. The method according to claim 6, wherein the phosphite is a monophosphite having the following formula:

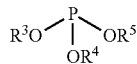

wherein
$R^3$-$R^5$ are independently a C6-C16 alkyl group or a C6-C18 aromatic group, or any two adjacent $R^3$-$R^5$ groups form a cyclic structure linked by a C1-C3 alkylene group.

8. The method according to claim 6, wherein the hindered phenol is a 1,1,3-tris(2-methyl-4-hydroxy-5-tert-butylphenyl)butane or a 4,4'-butylidenebis(6-tert-butyl-3-methylphenol).

9. The method according to claim 1, wherein the phosphite is a monophosphite having the following formula:

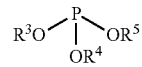

wherein
$R^3$-$R^5$ are independently a C6-C16 alkyl group or a C6-C18 aromatic group, or any two adjacent $R^3$-$R^5$ groups form a cyclic structure linked by a C1-C3 alkylene group.

10. The method according to claim 9, wherein the hindered phenol is a 1,1,3-tris(2-methyl-4-hydroxy-5-tert-butylphenyl)butane or a 4,4'-butylidenebis(6-tert-butyl-3-methylphenol).

11. The method according to claim 1, wherein the hindered phenol is a 1,1,3-tris(2-methyl-4-hydroxy-5-tert-butylphenyl)butane or a 4,4'-butylidenebis(6-tert-butyl-3-methylphenol).

* * * * *